United States Patent
Sasaki et al.

(10) Patent No.: US 9,205,441 B2
(45) Date of Patent: Dec. 8, 2015

(54) COATING APPARATUS FOR APPLYING A UV CURABLE RESIN TO A THREADED END OF A STEEL PIPE

(75) Inventors: Masayoshi Sasaki, Wakayama (JP);
Katsutoshi Sumitani, Wakayama (JP);
Takumi Nakamura, Wakayama (JP);
Jun Masubuchi, Wakayama (JP)

(73) Assignees: NIPPON STEEL & SUMITOMO METAL CORPORATION, Tokyo (JP);
VALLOUREC MANNESMANN OIL & GAS FRANCE, Aulnoye-Aymeries (FR)

( * ) Notice: Subject to any disclaimer, the term of this patent is extended or adjusted under 35 U.S.C. 154(b) by 304 days.

(21) Appl. No.: 13/819,430

(22) PCT Filed: Aug. 29, 2011

(86) PCT No.: PCT/JP2011/070089
§ 371 (c)(1),
(2), (4) Date: May 13, 2013

(87) PCT Pub. No.: WO2012/029967
PCT Pub. Date: Mar. 8, 2012

(65) Prior Publication Data
US 2013/0228122 A1    Sep. 5, 2013

(30) Foreign Application Priority Data

Aug. 31, 2010  (JP) ................. 2010-194156

(51) Int. Cl.
*B05B 15/00*   (2006.01)
*B05C 5/02*    (2006.01)
*F16L 58/18*   (2006.01)
*B05B 13/04*   (2006.01)

(52) U.S. Cl.
CPC ............. *B05B 15/00* (2013.01); *B05B 13/0436* (2013.01); *B05B 13/0442* (2013.01); *B05C 5/0295* (2013.01); *F16L 58/182* (2013.01); *B05C 5/02* (2013.01)

(58) Field of Classification Search
None
See application file for complete search history.

(56) References Cited

U.S. PATENT DOCUMENTS

2012/0034376 A1 *    2/2012   Nakamura et al. ............ 427/233

FOREIGN PATENT DOCUMENTS

| JP | 58-219964 | 12/1983 | |
|----|-----------|---------|---|
| JP | 60-205091 | 10/1985 | |
| JP | 62-061667 | 3/1987 | |
| JP | 05-064762 | 3/1993 | |
| JP | 2003-053220 | 2/2003 | |
| JP | 2006-317688 | 11/2006 | |
| RU | 2270883 | 2/2006 | |
| WO | 2009/072486 | 6/2009 | |
| WO | WO 2010/113948 A1 * | 10/2010 | .......... B05B 13/0442 |

* cited by examiner

*Primary Examiner* — Dah-Wei D Yuan
*Assistant Examiner* — Jethro M Pence
(74) *Attorney, Agent, or Firm* — Clark & Brody

(57) ABSTRACT

A coating apparatus for forming a thin UV curable resin coating on threaded end portions of a steel pipe comprises a spraying unit having at least two nozzles adapted to spray the resin coating composition by pneumatic atomization toward the threaded end portion of the steel pipe, a resin supply system for supplying the resin coating composition to each nozzle, and a first nozzle support means which supports each nozzle for movement in the axial direction of the steel pipe and in the vertical direction. The two nozzles are disposed at different positions at least in the axial direction of the steel pipe at angles which are sloped such that the sprayed streams from the nozzles approach each other. The resin supply system has a regulator for maintaining the spraying air pressure of the resin coating composition in each nozzle of the spraying unit at a predetermined respective value.

10 Claims, 5 Drawing Sheets

COATING APPARATUS FOR APPLYING A UV CURABLE RESIN TO A THREADED END OF A STEEL PIPE

TECHNICAL FIELD

This invention relates to a coating apparatus for applying a UV (ultraviolet) curable resin coating composition by spray coating to the outer or inner surface of an end portion of a steel pipe which has threads and which forms a pin or a box of a threaded joint for pipes having a pin-box structure which is used to connect steel pipes typified by oil country tubular goods. The present invention also relates to a system which comprises this coating apparatus and which is used to form a UV cured resin coating on the inner or outer surface of an end portion of a steel pipe having threads.

BACKGROUND ART

Oil well country tubular goods (OCTG) such as tubing and casing used in the excavation of oil wells are steel pipes having a length of around 10 some meters in which threads are formed on each end, and they are assembled to a necessary length by successively connecting the steel pipes in the field by means of threaded joints for pipes. Such threaded joints for pipes generally have a pin-box structure using a pin, which is a joint element having male threads, and a box, which is a corresponding joint element having female threads.

In a coupling-type threaded joint which is typically used for connecting oil country tubular goods, a pin is formed on the outer surface of both ends of a steel pipe which forms an oil country tubular good, and a box is formed on the inner surface of both sides of a short separate connecting member referred to as a coupling. There is a different type of threaded joint for pipes referred to as an integral type in which a pin is formed on the outer surface of one end of a steel pipe and a box is formed on the inner surface of the other end of the steel pipe and steel pipes are connected without using a coupling.

The depth of an oil well is normally 2,000-3,000 meters, but in recent deep wells such as undersea oil fields, the depth can reach 8,000-10,000 meters or more.

Therefore, a threaded joint for pipes used to connect oil country tubular goods is subjected in the environment of use not only to a tensile force in the pipe axial direction caused by the weight of oil country tubular goods and couplings but also to the combination of internal and external pressures and heat. As a result, the joint needs to be able to maintain gas tightness without being damaged even under a severe environment of use. During the process of lowering tubing or casing, a joint which has previously been tightened is sometimes loosened and retightened. API (American Petroleum Institute) standards require that tightening (makeup) and loosening (breakout) can be performed 10 times for a joint for tubing and 3 times for a joint for casing while maintaining gas tightness without the occurrence of non-repairable seizing referred to as galling.

A threaded joint for pipes referred to as a premium joint can form a metal-to-metal seal to provide improved gas tightness even under high stresses. In a premium joint, both the pin and the box have unthreaded metal contact portions in addition to threads. The unthreaded metal contact portions of the pin and the box directly contact each other to form a metal-to-metal seal whereby excellent gas tightness is exhibited. The unthreaded metal contact portion of the pin is constituted by a metal sealing surface positioned closer to the end of the pin than the threads on the outer peripheral surface of the pin and by a torque shoulder at the end of the pin. A corresponding metal sealing surface and torque shoulder are provided on the inner peripheral surface of the box. When the pin is inserted into the box and the threads are tightened until the torque shoulders contact each other, the metal sealing surfaces of the pin and the box intimately contact each other with a predetermined interference and form a metal-to-metal seal. A portion of the compressive load due to tightening is resisted by the torque shoulders which contact each other, whereby stress on the threads is decreased.

In a premium joint, it is important to provide sufficient lubricity to prevent galling because galling easily takes place on the unthreaded metal contact portions and particularly on the metal sealing surfaces. Until now, a highly viscous lubricating grease often referred to as dope or compound grease (referred to below as dope) has been applied to the surfaces of a pin and a box which contact each other at the time of makeup including the threads and unthreaded metal contact portions of a threaded joint for oil country tubular goods (referred to below simply as the contact surfaces of a threaded joint) prior to shipment with the object of increasing galling resistance and gas tightness and to prevent the contact surfaces from rusting until the time of use.

In the case of a coupling-type threaded joint for oil country tubular goods, in order to increase the circularity and shape accuracy of the end surface of a long steel pipe and to prevent the fluid which is flowing through the pipe from being disturbed by the connecting portion of the joint, a portion referred to as a recess or a chamfer which is cut into the shape of a taper has often been provided on the inner surface of the end of the pipe constituting a pin. Dope is also applied to the recess formed on the inner surface of a pin in order to prevent rusting.

In this manner, in the end portion of a steel pipe forming a pin, dope is applied not only to the outer surface and to the end surface, which are contact surfaces with a box, but it is also applied to the inner surface where a recess is formed. In order to guarantee lubricating properties and rust preventing properties (corrosion resistance), dope which was used in the past contained a large amount of powders of heavy metals such as Pb and Zn. Dope was usually applied by brush application, more specifically by dropping a suitable amount of dope onto the contact surfaces of a threaded joint and then spreading it with a brush.

Below-identified Patent Documents 1 and 2 disclose apparatuses for applying a highly viscous liquid lubricant like the above-described dope to the threads of a threaded joint for pipes which have a nozzle head for spraying a lubricant and a brush for spreading the sprayed lubricant.

With the enactment in 1998 of the OSPAR Convention (Oslo-Paris Convention) for preventing marine pollution in the Northeast Atlantic, strict environmental regulations are being enacted on a global scale, and particularly in North Sea oil fields, it is required to use lubricants not containing heavy metals with the object of preventing marine pollution. In order to minimize the discharge of substances causing marine pollution in the excavation of gas wells or oil wells on offshore rigs, the environmental impact of materials used on rigs which have the possibility of being discharged into the environment is being evaluated, and there is a trend of prohibiting the use of substances which do not satisfy the standards of a particular country or region. As a result, there have been various proposals of methods of lubricating and preventing rusting of threaded joints for pipes without requiring the application of dope.

Below-identified Patent Document 3 proposes a threaded joint for pipes having a box surface with a solid lubricating coating having plastic or viscoplastic Theological properties such as one made from a hot melt resin, and a pin surface having a solid corrosion protecting coating made from a UV curable resin. The thickness of the solid corrosion protecting coating made from a UV curable resin is preferably in the range of 5-50 μm and more preferably in the range of 10-40 μm.

In the threaded joint for pipes described in Patent Document 3, a UV cured resin coating is formed on the outer surface of an end portion of a steel pipe forming a pin. A UV cured resin coating is hard and its effect on prevention of corrosion is high. In addition, it is highly transparent, so it has the advantage that it is possible to inspect for the presence of damage on the threads of the pin, which is formed on the outer surface of a pipe and easily undergoes damage, without removing the coating. The solid lubricating coating formed on the surface of the box can flow when subjected to a high pressure. Therefore, even though the solid lubricating coating is applied only to the box surface, excellent lubricating properties which can prevent galling of a threaded joint for pipes are obtained during repeated makeup and breakout. The UV cured resin coating on the pin surface and the solid lubricating coating on the box surface both are non-tacky coatings (referred to as dry coatings), and they prevent the occurrence of galling due to the adhesion of foreign matter which occurs with dope.

PRIOR ART DOCUMENTS

Patent Documents

Patent Document 1: JP 58-219964 A
Patent Document 2: JP 62-061667 A
Patent Document 3: WO 2009/072486

SUMMARY OF THE INVENTION

When manufacturing the threaded joint for pipes described by Patent Document 3, a UV curable resin coating composition is applied to the outer surface of an end portion of a steel pipe which forms a pin and is irradiated with ultraviolet light to form a UV cured resin coating. As stated above, as the recess formed on the inner surface of a pin requires rust preventing properties, it is also desirable to form a UV cured resin coating for preventing rusting on the inner surface of the end portion of a steel pipe forming a pin.

A UV cured resin coating must be formed with a thin, uniform thickness and with good adhesion to the surface of an end portion of a steel pipe including the threads thereof. It is advantageous to have a large coating thickness from the standpoint of preventing rust during transport from shipment of a steel pipe until arrival at an oil well excavation site and during storage.

The threads and the unthreaded metal contact portions of a threaded joint for a pipe have shaped which are designed so that leaks do not develop when a prescribed makeup torque is applied at the site of oil well excavation. Therefore, if the thickness of a coating becomes too large, the shape of the threads does not satisfy the tolerance for dimensional accuracy, and it is sometimes not possible to perform makeup with a prescribed torque and obtain a metal seal necessary for guaranteeing gas tightness.

It was found that the optimal coating thickness of the UV cured resin coating for satisfying these mutually opposite conditions is around 25-35 μm. For mass production of the threaded joint for pipes disclosed in Patent Document 3, it is necessary to form a UV cured resin coating with a thickness in this range with a thickness tolerance of around 10 μm.

The above-mentioned coating apparatuses described in Patent Documents 1 and 2 apply a grease-like dope (compound grease) and spread the dope using a brush. As a result, a difference in the coating thickness develops between portions which are contacted by the bristles of the brush and portions which are not contacted thereby, and the coating becomes thin on the thread crests which are particularly strongly contacted by the brush bristles. Accordingly, a coating apparatus using a brush as disclosed in Patent Documents 1 and 2 cannot accurately form a uniform thin coating with a thickness tolerance of around 10 μm.

UV curable resin coating compositions include volatile solvent-containing coating compositions and solventless coating compositions which do not contain a volatile solvent. Solventless coating compositions are preferred from the standpoint of working environments, but they generally have a high viscosity, which interferes with forming a coating of uniform thickness.

The object of the present invention is to provide a coating apparatus for a UV curable resin coating composition which can form a thin UV cured resin coating with a uniform thickness on the outer or inner surface of an end portion of a steel pipe which has threads and forms a pin or a box of a threaded joint for pipes, even if a solventless composition is used.

The present invention provides a coating apparatus for applying by spray coating a UV curable resin coating composition to the outer surface or the inner surface of an end portion of a steel pipe which has threads and which constitutes a pin or a box of a threaded joint for pipes. The coating apparatus is characterized by comprising a steel pipe support means which supports a steel pipe while rotating it about its longitudinal axis, a first spraying unit having at least two nozzles adapted to spray a UV curable resin coating composition by pneumatic atomization toward the outer or inner surface of the end portion of a steel pipe having threads, a UV curable resin supply system having a tank which stores a UV curable resin coating composition and a pump for supplying the UV curable resin coating composition from the tank to each nozzle of the first spraying unit, and a first nozzle support means which supports each nozzle of the first spraying unit so as to be movable in the axial direction of the steel pipe and in the vertical direction (upwards and downwards), wherein the two nozzles of the first spraying unit are disposed at positions which are different at least in the axial direction of the steel pipe at angles which are sloped so that the sprayed streams from the nozzles approach each other from opposite sides of a plane perpendicular to the axis of the steel pipe, and wherein the UV curable resin supply system comprises a first regulator for maintaining the spraying air pressure of the UV curable resin coating composition in each nozzle of the first spraying unit at a predetermined respective value.

In order to make the coating apparatus according to the present invention usable with a solventless coating composition having a high viscosity, the UV curable resin supply system preferably further includes a heater for adjusting the viscosity of the UV curable resin coating composition.

A coating apparatus according to the present invention is particularly suitable for forming a UV cured resin coating on the outer surface of a threaded end portion of a steel pipe forming a pin of a threaded joint for pipes. In this case, a UV cured resin coating is preferably also formed in a recess formed on the inner surface of the end portion of the steel pipe for the purpose of corrosion protection.

In a preferred mode, a coating apparatus according to the present invention can apply a UV curable resin coating composition not only to the outer surface of a threaded end portion of a steel pipe (i.e., to a pin) but also to the inner surface thereof. Such a coating apparatus further includes the following:

a second spraying unit having at least one nozzle for spraying a UV curable resin coating composition by pneumatic atomization toward whichever of the outer surface and the inner surface of the end portion of the steel pipe is not coated by the first spraying unit, and a second nozzle support means which supports the nozzle of the second spraying unit so as to be movable in the vertical direction (upwards and downwards), wherein the UV curable resin supply system supplies the UV curable resin coating composition from the tank to the nozzle of the second spraying until and includes a second regulator for maintaining the spraying air pressure of the UV curable resin coating composition in the nozzle of the second spraying unit at a predetermined value.

Features of a preferred mode of a coating apparatus according to the present invention are as follows:
- the two nozzles of the first spraying unit are disposed at positions which are different also in the circumferential direction of the steel pipe;
- the second nozzle support means supports the nozzle of the second spraying unit so as to be movable also in the axial direction of a pipe;
- the first spraying unit sprays the UV curable resin coating composition on the outer surface of the end portion of a steel pipe which forms a pin of a threaded joint for pipes;
- the absolute values of the angles of slope of the two nozzles of the first spraying unit which are disposed at sloping angles are in the range of 20°-40° with respect to a plane perpendicular to the axis of the steel pipe; and
- the UV curable resin supply system has a circulation path which circulates the UV curable resin coating composition from a nozzle of a stopped spraying unit to the nozzle through the pump and the heater when one or both of the first and second spraying units are stopped.

The present invention also provides a system for forming a UV cured resin coating on the inner or outer surface of an end portion of a steel pipe having threads, the system having the above-described coating apparatus, a steel pipe transporting means for transporting the steel pipe in the lateral direction (in the direction perpendicular to the pipe axis direction on a horizontal plane), and an ultraviolet light irradiation apparatus which is disposed downstream of the coating apparatus in the transport direction of the steel pipe and which has at least one lamp for irradiating one or both of the inner surface and the outer surface of the end portion of the steel pipe with ultraviolet light.

In this system, the ultraviolet light irradiation apparatus preferably has a mechanism for rotating the steel pipe around its longitudinal axis. The lamp of the ultraviolet light irradiation apparatus which irradiates the outer surface of the end portion of the steel pipe with ultraviolet light is preferably supported so as to be movable in the vertical direction (upwards and downwards).

By using a coating apparatus and system according to the present invention, it is possible to form a UV cured resin coating which has a uniform thickness with a tolerance of at most 10 μm, the coating having a thickness necessary for corrosion protection such as around 25-30 μm, on the outer or inner surface of an end portion of a steel pipe constituting a pin or a box of a threaded joint for pipes. As a result, it is possible to carry out mass production of a threaded joint for pipes which has excellent gas tightness and excellent galling resistance, and which can reliably form a metal-to-metal seal when it is made up with a prescribed torque. By connecting oil country tubular goods using a threaded joint for pipes which is manufactured in this manner, the problems of environmental pollution experienced when using a conventional dope are avoided, and the efficiency of connecting oil country tubular goods in the field is increased.

EXPLANATION OF SYMBOLS

Figure 1:
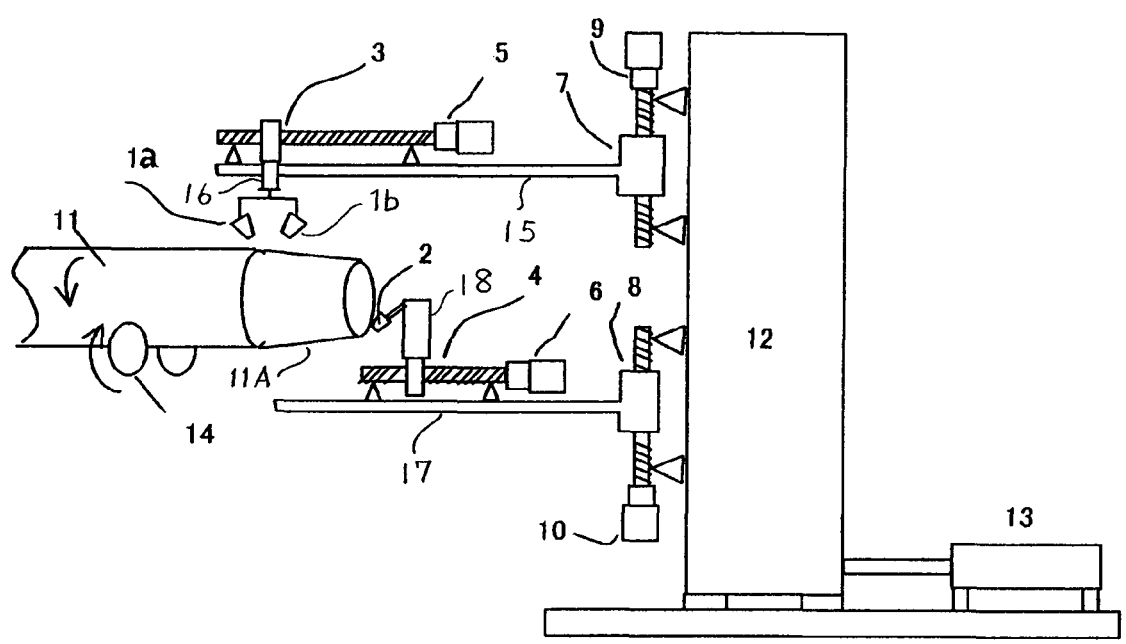
FIG. 1 is a diagram schematically showing the structure of a coating apparatus according to the present invention.

1$a$, 1$b$: outer surface (coating) nozzles
2: inner surface (coating) nozzle
3: ball screw for moving the outer surface nozzles in the pipe axial direction
4: ball screw for moving the inner surface nozzle in the pipe axial direction
5: servomotor for moving the outer surface nozzles in the pipe axial direction
6: servomotor for moving the inner surface nozzle in the pipe axial direction
7: ball screw for moving the outer surface nozzles in the vertical direction
8: ball screw for moving the inner surface nozzle in the vertical direction
9: servomotor for moving the outer surface nozzles in the vertical direction
10: servomotor for moving the inner surface nozzle in the vertical direction
11: steel pipe for oil country tubular good; 11A: pin; 11B: recess
12: body of coating apparatus
13: air cylinder for moving the body forwards and backwards
14: turning roller
21: storage tank for UV curable resin coating composition
22: pump; 22A: air regulator; 23: heater
24$a$, 24$b$, 24$c$: regulators (for adjusting spraying air pressure)
25$a$, 25$b$, 25$c$: air regulator (for adjusting compressed air pressure)
26: atomizing air supply path for outer surface coating
27: discharge air supply path for outer surface coating 28: atomizing air supply path for inner surface coating
29: discharge air supply path for inner surface coating
31: UV lamp for irradiating outer surface
32: UV lamp for irradiating inner surface
33: ball screw; 34: servomotor
35: steel pipe for oil country tubular good
36: body of irradiating apparatus
37: air cylinder for moving body backwards and forwards
38: turning roller

MODES FOR CARRYING OUT THE INVENTION

Below, the present invention will be explained with respect to an embodiment which forms a UV cured resin coating by applying a UV curable resin coating composition to the outer surface of an end portion of a steel pipe which has male threads and which forms a pin of a typical coupling-type threaded joint for pipes. This threaded joint for pipes is preferably a premium joint having threads and an unthreaded metal contact portion.

A coating apparatus according to the present invention is not limited to this embodiment. For example, a coating apparatus according to the present invention can be used for an integral threaded joint for pipes which does not need a coupling and which has a pin on the outer surface of one end of a steel pipe and a box on the inner surface of the other end. Namely, a coating apparatus according to the present invention can also form a UV cured resin coating on the inner surface of an end portion of a steel pipe which includes female threads and constitutes a box of a threaded joint for pipes.

As stated above, a recess (or chamfer) which is cut with a tapered shape is often formed on the inner surface of an end portion of a steel pipe forming a pin of a threaded joint for pipes. In a preferred embodiment, a coating apparatus according to the present invention can apply a lubricant not only to the outer surface of an end portion of a steel pipe forming a pin but also to a recess on the inner surface of the pipe end portion. Below, this preferred embodiment will be explained.

A coating apparatus according to the present invention has a steel pipe support means, a first spraying unit for spray coating of the outer surface of an end portion of a steel pipe with a UV curable resin coating composition, a UV curable resin supply system having a tank and a pump, and a first nozzle support means. In a preferred embodiment which can apply a UV curable resin coating composition to the inner surface (such as to a recess) of the end portion of a steel pipe as well, a coating apparatus according to the present invention further includes a second spraying unit for spray coating of a UV curable resin coating composition on the inner surface of the end portion of a steel pipe and a second nozzle support means. The UV curable resin supply system supplies a UV curable resin coating composition from the tank to the nozzles of the first and second spraying units, and it has a first and a second regulator which maintain the spraying air pressures of the UV curable resin coating composition in each of the nozzles of the first and second spraying units at predetermined values.

Below, each of the elements constituting a coating apparatus according to the present invention will be explained while referring to the attached drawings.

Figure 2:
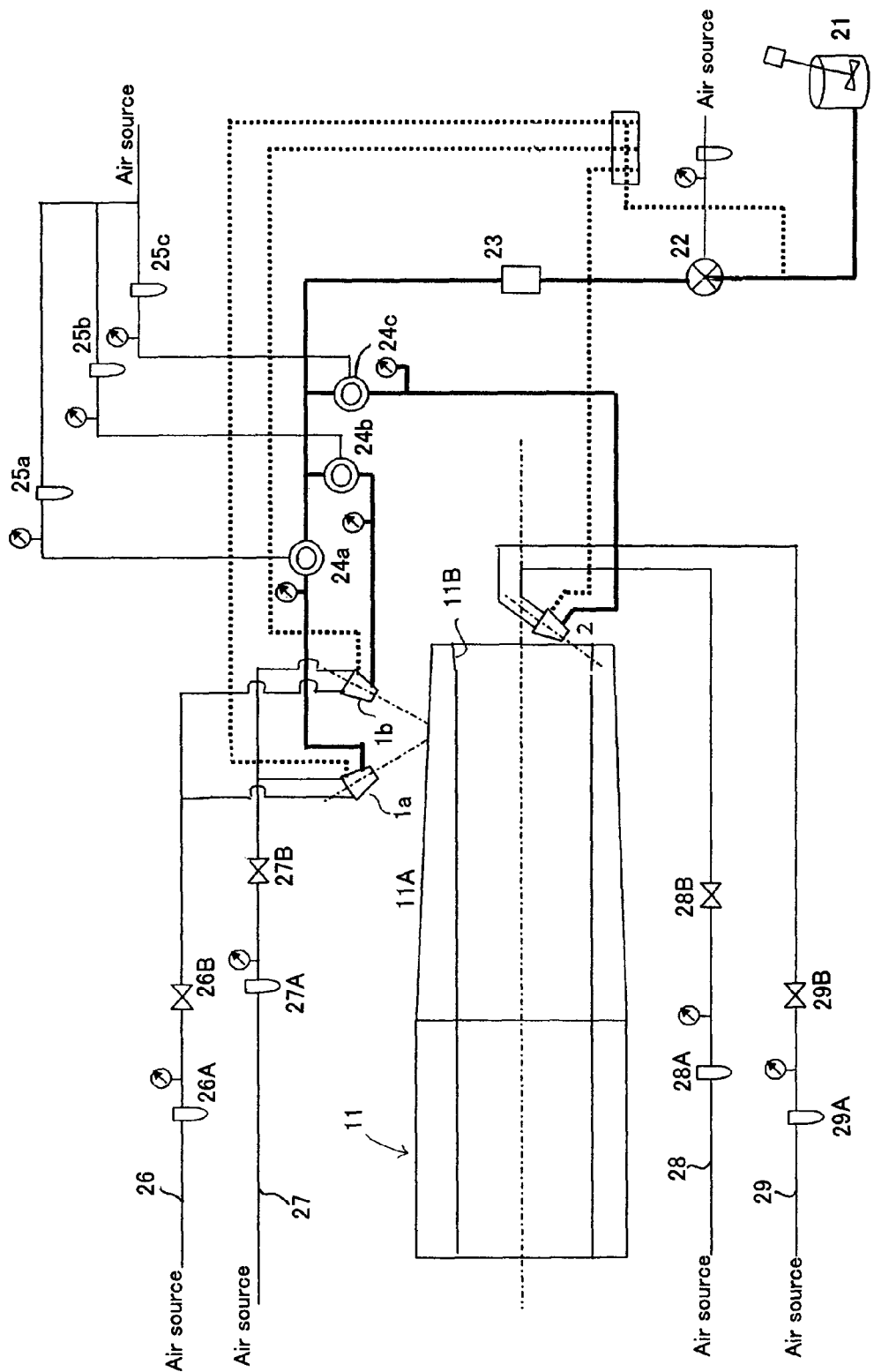
FIG. 2 is an explanatory view schematically showing the flow of a coating composition and air in a UV curable resin supply system of a coating apparatus according to the present invention.

[Steel Pipe Support Means]
Referring to FIG. 1 and FIG. 2, a steel pipe 11 used as an oil country tubular good has a pipe end portion which forms a pin 11A of a threaded joint for pipes. In FIG. 1 and FIG. 2, an end portion of the steel pipe which constitutes a pin is simply shown in a tapered shape. In actuality, as is well known to those skilled in the art, male threads and an unthreaded metal contact portion for forming a metal-to-metal seal are formed on the outer surface of the end portion of the steel pipe which constitutes a pin 11A. As shown in FIG. 2, a recess 11B which is cut in a tapered shape is formed on the inner surface of the end portion of the steel pipe.

A coating apparatus according to the present invention can apply a UV curable resin coating composition not only to the pin 11A on the outer surface of the end portion of the steel pipe but also to the recess 11B on its inner surface.

The steel pipe support means supports the steel pipe 11 while rotating it about its longitudinal axis. In the illustrated mode, the steel pipe support means comprises turning rollers 14 arranged in pairs. In FIG. 1, only one pair of turning rollers 14 positioned near one end of a steel pipe is shown, but in actuality, further turning roller pairs are provided near the other end of the steel pipe and at one or more points therebetween and normally at 3-8 points (see FIG. 6).

These multiple pairs of turning rollers have their rotational speeds (the feed speed of a steel pipe) synchronized, and they rotate a steel pipe around its longitudinal axis at a predetermined rotational speed. A steel pipe support means is not limited to the illustrated turning rollers, and any means can be used which can rotate a steel pipe around its longitudinal axis at a predetermined speed.

[First Spraying Unit for Coating the Outer Surface]
The illustrated embodiment of an apparatus sprays a UV curable resin coating composition on the surface of a pin, namely on the outer surface of an end portion of a steel pipe having threads. Therefore, the first spraying unit is disposed so as to spray a UV curable resin coating composition on the outer surface of an end portion of a steel pipe.

The first spraying unit for coating the outer surface has at least two (two in the illustrated example) spraying nozzles 1a and 1b. As shown in FIG. 2, these nozzles are supplied with a UV curable resin coating composition and air for spraying the coating composition by pneumatic atomization in such a manner that the UV curable resin coating composition can be air sprayed uniformly with a predetermined air pressure. The nozzles can be opened and closed, and they can be closed when the coating composition is not being sprayed from the nozzles. Means for opening and closing the nozzles are known to those skilled in the art. Each nozzle is mounted on the below-described first nozzle support means in such a manner that the angle of slope of each nozzle can be adjusted.

As described below, two nozzles are disposed so that the streams sprayed therefrom approach each other from opposite sides of a plane perpendicular to the pipe axis, namely, they are sloped at an angle such that the nozzles approach each other toward their front ends (tips). The angle of slope of the nozzles will be described below. When the first spraying unit has three or more nozzles, at least two of the nozzles and preferably two adjoining nozzles are disposed so as to slope in the above-described manner.

In the figures, the two nozzles 1a and 1b look to be disposed at positions which differ only in the axial direction of a pipe, but preferably they are disposed so that their positions vary not only in the axial direction of a pipe but also in the circumferential direction thereof. Namely, one of the two nozzles is disposed above the plane of the figure and the other is disposed below the plane of the figure.

As a result, interference between the two sprayed streams is avoided. When there are three or more nozzles, at least two of the nozzles and preferably all of the nozzles are disposed so that their positions vary at least in the axial direction and preferably both in the axial direction and in the circumferential direction of a pipe.

Figure 4:
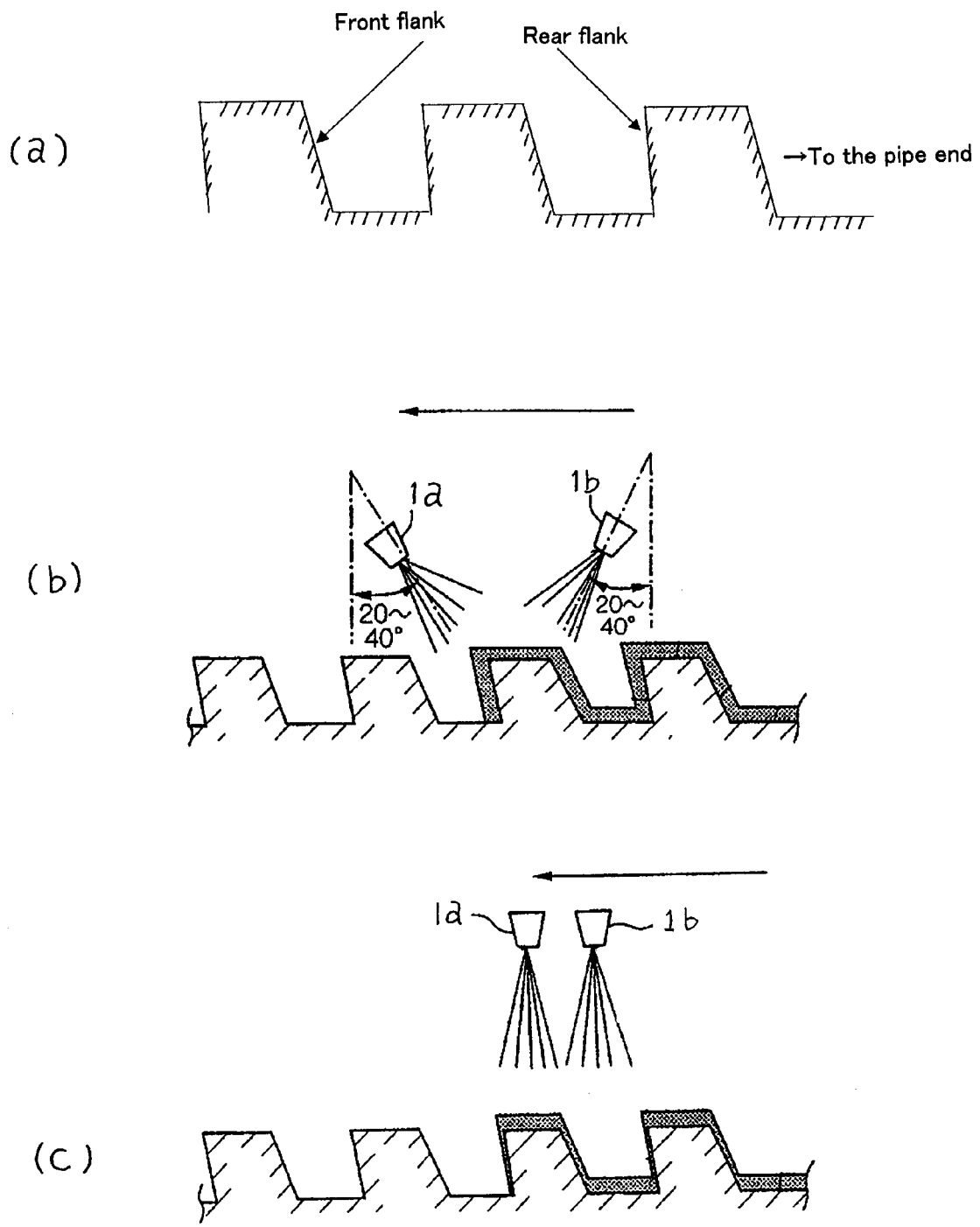
FIG. 4($a$) is an explanatory view showing an example of the cross-sectional shape of trapezoidal threads formed on an end portion of a steel pipe, and FIGS. 4($b$) and 4($c$) are explanatory views showing the orientations of two nozzles and a coating film formed on threads.

The expression "the sprayed streams approach each other from opposite sides of a plane perpendicular to the pipe axis" means that spraying is carried out from opposite sides of a plane perpendicular to the pipe axis such that a thread is sprayed from both the front and rear flank sides as shown in cross section in FIG. 4(b).

[First Nozzle Support Means]

The first nozzle support means supports the nozzles 1a and 1b in the first spraying unit for coating the outer surface (hereinafter referred to simply as outer surface nozzles) so as to be movable in two directions, namely, in the axial direction of the steel pipe and in the vertical direction (upwards and downwards). In the illustrated embodiment, the first nozzle support means is constituted by a ball screw 3 for moving the outer surface nozzles in the pipe axial direction and a servomotor 5 for axial movement of the outer surface nozzles which controls the movement of ball screw 3 in the pipe axial direction, as well as a ball screw 7 for moving the outer surface nozzles in the vertical direction and a servomotor 9 for vertical movement of the outer surface nozzles which controls the movement of ball screw 7 in the vertical direction (up and down movement).

More specifically, the ball screw 7 which has a movable nut and which is disposed for vertical movement of the outer surface nozzles is supported in the vertical position by a body 12 of the coating apparatus, and the ball screw 3 which is disposed for moving the outer surface nozzles in the pipe axial direction is supported by a horizontal support member 15 which extends in parallel with the pipe axis from the movable nut of the ball screw 7 for vertical movement. Accordingly, the ball screw 3 for moving in the pipe axial direction can also move in the vertical direction. The outer surface nozzles 1a and 1b are secured to a short vertical support member 16 which extends downwards from the nut of the ball screw 3 for axial movement. The vertical support member 16 A has a hole, through which the horizontal support member 15 passes. As a result, during operation of the two ball screws 3 and 7, the nozzles 1a and 1b can be moved in the pipe axial direction and the vertical direction by rotation of the screws without rotation of the nuts thereof.

[Second Spraying Unit for Coating the Inner Surface]

The illustrated embodiment is designed so that a UV curable resin coating composition can be spray coated also on the inner surface of an end portion of the steel pipe, namely, on the surface of the recess 11B formed by machining on the inner surface of an end portion of the steel pipe. The axial length of the recess 11B is shorter than the axial length of the pin 11A and its surface is generally smooth with no threads.

Therefore, it is sufficient for the second spraying unit used for coating the unthreaded inner surface of an end portion of a steel pipe to have only one nozzle 2 for inner surface coating. Of course, it is possible to provide two or more nozzles.

In the same manner as the outer surface coating nozzles 1a and 1b, the inner surface coating nozzle 2 uniformly spray the UV curable resin coating composition by pneumatic atomization of the coating composition with air at a predetermined pressure, and the nozzle can be opened and closed.

The inner surface coating nozzle can be disposed in the vertical position, or as shown in the drawing, it can be sloped towards the rear of the pipe. The angle of slope is preferably at most 40° with respect to a plane perpendicular to the pipe axis. The area which is coated by spray coating by one nozzle 2 for inner surface coating and accordingly the width of coating formed in the pipe axial direction is determined by the angle of slope of the nozzle and the position of the nozzle in the vertical direction.

[Second Nozzle Support Means]

The second nozzle support means supports the nozzle 2 of the second spraying unit for coating the inner surface (hereinafter simply referred to as inner surface nozzle) so as to be movable at least in the vertical direction. As the width of spraying in the pipe axial direction by the second spraying unit is much shorter than that of the first spraying unit which coats the pin surface, it is sometimes possible to adequately coat the recess just by moving the nozzle in the vertical direction (up and down) (as a result of which the width of spraying in the pipe axial direction varies as described above). Accordingly, the second nozzle support means need not have the ability to move the nozzle in the pipe axial direction. However, in the same manner as the nozzles of the first spraying unit, the nozzle of the second spraying unit can preferably move not only in the vertical direction but also in the pipe axial direction. As a result, it becomes possible to apply the UV curable resin coating composition over a wider area of the inner surface. This is the case in the illustrated example.

In the illustrated example, the second nozzle support means is constituted by a ball screw 4 for moving the inner surface nozzle in the pipe axial direction and a servomotor 6 for inner surface nozzle axial movement which controls the movement of ball screw 4 in the pipe axial direction, as well as a ball screw 8 for moving the inner surface nozzle in the vertical direction and a servomotor 10 for inner surface nozzle vertical movement which controls the movement of ball screw 8 in the vertical direction.

In the same manner as for the first nozzle support means, the ball screw 8 which is disposed for vertical movement of the inner surface nozzle is supported in the vertical position by the body 12 of the coating apparatus, and the ball screw 4 which is disposed for moving the inner surface nozzle in the pipe axial direction is supported by a horizontal support member 17 which extends in parallel with the pipe axis from the movable nut of the ball screw 8 for vertical movement. As a result, the ball screw 4 for moving in the pipe axial direction can also move in the vertical direction. The inner surface nozzle is secured to the vicinity of the upper end of a short vertical support member 18 so as to slope downwardly, with the vertical support member 18 being mounted so as to extend upwardly from the nut portion of the ball screw 4 for moving the inner surface nozzle in the pipe axial direction. A suitable support means is employed so that at the time of operation of the two ball screws 4 and 8, the screws rotate without rotation of the nuts. In this manner, the inner surface nozzle 2 can move in the pipe axial direction and in the vertical direction.

In the illustrated example, an example was given of a system in which each of the outer surface nozzles and the inner surface nozzle is moved by a ball screw and a servomotor, but one skilled in the art can employ a different moving system such as a hydraulically controlled one.

The ball screw 7 for vertical movement of the outer surface nozzles in the first nozzle support means and the ball screw 8 for vertical movement of the inner surface nozzle in the second nozzle support means are both supported by the vertical body 12 of the coating apparatus, and the body 12 is driven to move forwards and backwards (namely, in the pipe axial direction) by an air cylinder 13 for moving the body forward and backward. With this structure, the outer surface nozzles 1a and 1b and the inner surface nozzle 2 can be moved to positions suitable for coating the end portion of the steel pipe. A drive means for the body is not limited to an air cylinder, and a hydraulic or other type of moving system can also be used.

The body 12 functions as a controller incorporating a control means and a control circuit for not only moving each of the nozzles in the pipe axial direction and the vertical direction, but for also controlling a below-described heater for adjusting the temperature of the coating composition, a pump for adjusting the flow rate of the coating composition, a regulator for adjusting the pressure of the coating composition, an accumulator for controlling the air pressure for atomizing, and the like. In this manner, a coating apparatus according to the present invention can be automated.

[UV Curable Resin Supply System]

As shown in FIG. 2, the UV curable resin supply system which supplies a UV curable resin coating composition to the nozzles 1a and 1b of the first spraying unit and the nozzle 2 of the second spraying unit has a tank 21 which stores the UV curable resin coating composition and a pump 22 which supplies the UV curable resin coating composition from the tank to each nozzle of the first and second spraying units. Compressed air having a controlled pressure is supplied to the pump 22 from an air source through an air regulator 22A to discharge the coating composition at a constant flow rate by the air pressure.

In FIG. 2, the paths shown by solid lines are the paths for supplying the UV curable resin coating composition from the tank 21 to each nozzle through the pump 22, and the paths shown by dotted lines are circulation paths which return the UV curable resin coating composition from the nozzles for reuse while the nozzles are not used for spray coating. As the UV curable resin coating composition does not cure unless it is subjected to ultraviolet irradiation, it can be circulated and repeatedly used.

In addition to the above-described tank and pump, the UV curable resin supply system in a coating apparatus according to the present invention includes regulators 24a, 24b, and 24c for maintaining the spraying air pressure of the UV curable resin coating composition in each nozzle of the first and second spraying units at a predetermined value, and preferably a heater 23 for adjusting the viscosity of the UV curable resin coating composition. Regulators 24a and 24b control the spraying air pressure of the UV curable resin coating composition supplied to the nozzles 1a and 1b of the first spraying unit, and regulator 24c controls the spraying air pressure of the UV curable resin coating composition supplied to the nozzle 2 of the second spraying unit. The air pressure for spraying the coating composition (coating pressure) in each nozzle is adjusted by supplying these regulators 24a, 24b, 24c with compressed air from an air supply through their respective air regulators 25a, 25b, 25c to control the air pressure. In order to form a uniform thin coating having a thickness of around 30 μm, it is necessary to obtain a stable spraying rate from each nozzle. For this purpose, a regulator capable of maintaining a constant coating pressure is provided upstream of each nozzle in the UV curable resin supply system.

Figure 3:
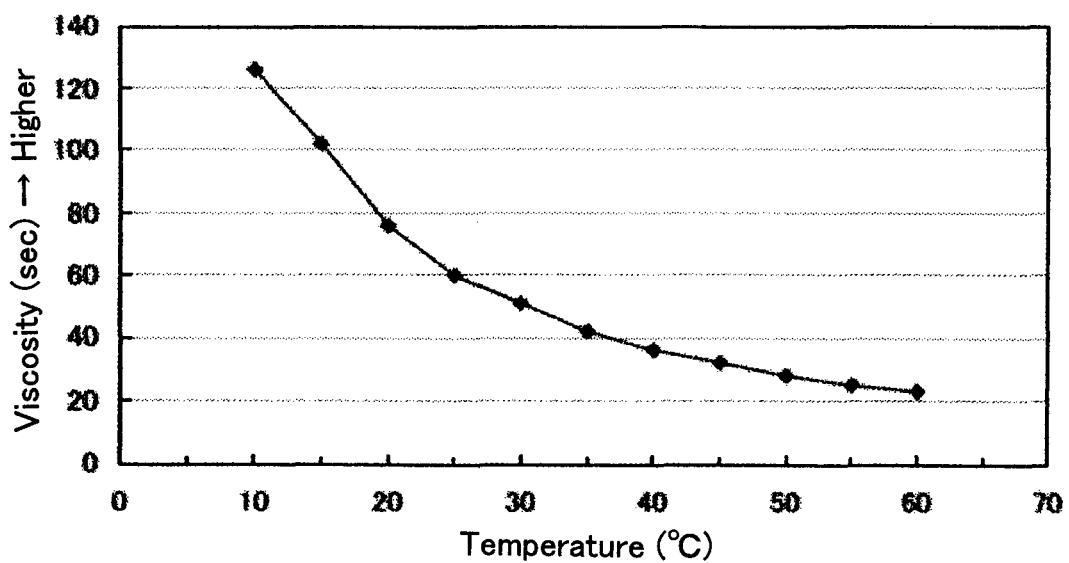
FIG. 3 is a graph showing the relationship between the viscosity (measured with a No. 4 Ford cup) and temperature of a UV curable resin coating composition.

As shown in FIG. 3, the viscosity of a solventless type UV curable resin coating composition is highly dependent upon its temperature, and the viscosity markedly changes in accordance with the temperature. Namely, the higher the temperature, the lower the viscosity of the coating composition, and under the same pressure and spraying conditions, the rate at which coating composition is sprayed from the nozzle varies with the temperature. Therefore, in a coating apparatus according to the present invention, it is preferred that the coating rate be maintained constant by disposing a heater 23 in the coating composition supply system and maintaining the temperature of the coating composition which is supplied to each nozzle for inner surface coating and outer surface coating at a predetermined temperature, particularly in the case using a solventless type UV curable resin coating composition. As shown in FIG. 2, the position of the heater 23 is preferably downstream of the pump 22 and upstream of the location where the coating composition supply system branches to each nozzle. However, it is also possible to dispose the heater 23 on the upstream side of the pump 22 or on the downstream side of the regulators (in this case, a heater is required for each nozzle).

The heating temperature of the coating composition by the heater 23 depends upon the type of coating composition, but preferably it is a temperature such that the viscosity of the coating composition is suitable for coating by the nozzles, such as a viscosity in the range of 30-40 seconds as measured using a No. 4 Ford cup. In general, the heating temperature is in the range of 35-45° C., for example, in the range of 35-40° C. The heater 23 is preferably one which can heat the coating composition to a predetermined temperature in a short length of time. For example, a Model NH-4 heater manufactured by Nordson Corporation can be used.

A NH-4 heater has a body including a built-in heating element and indirectly heats a coating composition passing through a coating composition flow path inside the body of the heater by the heating element through a heat transfer medium which is a liquid sealed inside the body.

In addition to the UV curable resin coating composition, compressed air is supplied to the nozzles 1a and 1b of the first spraying unit for outer surface coating and the nozzle 2 of the second spraying unit for inner surface coating through atomizing air supply paths 26 (for outer surface coating) and 28 (for inner surface coating) which feed air for atomizing the coating composition and through discharge air supply paths 27 (for outer surface coating) and 29 (for inner surface coating) which feed air for discharging the coating composition. Each of these paths feeds compressed air at a predetermined pressure to each nozzle from their respective air supplies through air regulators 26A-29A to control the air pressure. The coating composition is pneumatically atomized by the air pressure from the atomizing air supply paths 26, 28 to form a uniform mist. The coating composition which is atomized in this manner is discharged through the orifice of each nozzle toward the surface to be coated, which is the outer or inner surface of an end portion of the steel pipe, by the action of air of higher pressure which is supplied via the discharge air supply paths 27, 29, whereby coating is carried out.

Each of these compressed air supply paths has an on-off switch 26B-29B. When the coating operation is stopped, spraying of the coating composition from the nozzles is stopped by stopping the supply of compressed air from the atomizing air supply paths and the discharge air supply paths, and the coating composition which was sent to the nozzles is circulated to the UV curable resin supply system through the circulation paths. As shown in the drawing, after the coating composition circulation paths from each nozzle join together, they return to the coating composition supply path at a point upstream of the pump 22 so as to circulate via the supply pump 22 and the heater 23. Because the air supply paths to the nozzles are split between paths to the outer surface nozzles 1a and 1b and a path to the inner surface nozzle 2 and on-off control of each path is possible, it is possible to carry out inner surface coating and outer surface coating simultaneously or separately (for example, by carrying out only outer surface coating and not carrying out inner surface coating or by finishing inner surface coating earlier than outer surface coating).

As stated above, a solventless type UV curable resin coating composition has a higher viscosity than a typical coating composition which is diluted with a solvent, and a high pressure pump becomes necessary for spraying from a small diameter spray nozzle. In addition, the UV curable resin coating composition does not have lubricating properties, and this makes it difficult to use a typical metering pump which can be used when applying a liquid lubricant to a threaded joint for pipes. Therefore, a diaphragm pump or a special plunger pump is preferably used as a pump for supplying the UV curable resin coating composition.

[Coating Conditions for Outer Surface Coating by the First Spraying Unit]

The at least two nozzles 1a, 1b in the first spry unit for outer surface coating can move in both the pipe axial direction and the vertical direction, and the amount and speed of movement of these nozzles can be controlled by the servomotors 5 and 9 which drive their movement.

The position of the nozzles for outer surface coating in the vertical direction is set by the servomotor 9 for vertical movement at a location spaced from the pipe surface so as to achieve a predetermined spraying width W on the pipe surface.

During coating, the steel pipe 11 is rotated about its longitudinal axis at a predetermined speed by the turning rollers 14, and at the same time the outer surface coating nozzles 1a and 1b are moved in the pipe axial direction. This movement is carried out by driving the servomotor 5 for axial movement. As a result, the UV curable resin coating composition is applied to the outer surface of the end portion of the steel pipe in a helical shape.

If the spraying width of the coating composition from each nozzle is W (mm), the rotational speed of the pipe is n (rpm), and the number of pairs of outer surface nozzles disposed at different positions in the pipe axial direction so as to oppose each other is m (in FIGS. 1 and 2, m=1 with a pair of nozzles 1a, 1b), then the speed of movement V of the nozzles in the pipe axial direction (mm/minute) preferably satisfies the following Equation 1:

$$V \leq m \times n \times W \quad (1).$$

If the axial speed of movement V of the nozzles exceeds the upper limit determined by the above equation, portions which are not sufficiently coated develop between the helically coated portions, and coating becomes nonuniform in the pipe axial direction.

As a UV cured resin coating which is formed by the present invention is applied for the purpose of rust prevention, it is necessary to form a coating uniformly without unevenness over the entire surface of threads having surface irregularities. In spray coating, coating on the flanks of threads and on the bottom surfaces of threads which may be shaded is difficult.

Male threads formed on the outer surface of an end portion of a steel pipe constituting a pin are typically trapezoidal threads. As shown in FIG. 4(a), for example, towards the end of a steel pipe, there is a difference between the angles of slope of the front flanks and the rear flanks, and in particular there is sometimes a hook-shaped thread in which the rear flanks have a negative angle of slope with respect to a plane perpendicular to the pipe axis. In this case, if the outer surface coating nozzles 1a, 1b are disposed in a vertical direction, as shown in FIG. 4(c), although the UV curable resin coating composition can be thickly applied to the bottom surface and the top surface of the threads which are nearly horizontal, it is not possible to adequately apply the coating composition to the surfaces of the front and rear flanks and particularly to the rear flanks which have a negative angle of slope.

Therefore, in the present invention, as shown in FIG. 4(b), the two nozzles for outer surface coating are disposed at different positions in the pipe axial direction with angles of slope such that the sprayed streams from both nozzles approach each other from opposite sides of a plane perpendicular to the pipe axis so that the flanks of a trapezoidal thread shape can be uniformly coated with a sufficient thickness. Namely, one nozzle is oriented in a direction so as to coat the front flanks of threads and the other nozzle is oriented in a direction so as to coat the rear flanks of threads. The absolute value of the angle of slope of each of the two nozzles is preferably in the range of 20°-40° with respect to a plane perpendicular to the pipe axis (namely, 20° to 40° for one nozzle and −20° to −40° for the other nozzle). As a result, a UV curable resin coating composition can be uniformly applied to the surfaces of the root, crest, front flank, and rear flank of a thread. The absolute value of the angle of the slope may be different between the two nozzles.

The two nozzles for outer surface coating are preferably disposed at positions which differ not only in the pipe axial direction but also in the circumferential direction so that the streams of coating composition sprayed from the two nozzles do not interfere. The separation between the nozzles in the circumferential direction can be a distance so that the two sprayed streams do not interfere before reaching the surface of a steel pipe. This distance varies in accordance with the spreading angle of the sprayed streams and the distance between the nozzles and the surface of the steel pipe.

In order to make the coating thickness uniform at the position where coating starts and the position where coating ends, the two nozzles are preferably disposed so that the locations where the sprayed streams reach the pipe surface are the same in the pipe axial direction. This can be realized by adjusting the orientation of the two nozzles and the distance between them in the pipe axial direction so that extensions of the central axes of the two nozzles intersect at the surface of the steel pipe (at the thread crest in the case of a threaded portion).

Even if the locations where the sprayed streams reach the pipe surface are different in the pipe axial direction, in order to achieve a uniform coating thickness, the two nozzles must carry out spraying over the entire area on the threaded surface which is to be coated. In this case, at the start of spraying, a sprayed stream from one of the nozzles does not reach the pipe surface and runs to waste, and at the finish of spraying, the other nozzle sprays toward an area which is not to be coated.

In order to prevent this situation, a coating apparatus according to the present invention may have a suitable control function, for example, capable of controlling the timing of spraying so as to differ between the two nozzles.

Normally, in order to achieve a uniform coating weight, spraying is carried out so that the sprayed amount from the two nozzles oriented for coating the front flanks and the rear flanks is substantially the same. The angles of slopes of the nozzles may be varied manually, or a mechanism for adjusting the angles may be incorporated into the coating apparatus.

Instead of the above-described first and second nozzle support means, each nozzle may be supported by a general purpose articulated robot. With this arrangement, the angle of slope of each spray gun can be freely adjusted.

In order to shorten the time required for coating operation or increase the coating thickness, a plurality of pairs of nozzles 1a and 1b for outer surface coating which differ only in their positions in the circumferential direction of the steel pipe may be provided. In this case, pairs of nozzles disposed in positions which are the same in the pipe axial direction but different in the circumferential direction are regarded as one pair, and the speed of movement V of the nozzles in the pipe axial direction is controlled with the value of m in above-described Equation 1 set to 1.

In order to shorten the time for the coating operation, two pairs of nozzles 1a and 1b which are sloped so that their sprayed streams approach each other as described above can be disposed at different positions in the pipe axial direction. In this case, m in Equation 1 equals to 2, so the speed of movement of nozzles V in the pipe axial direction can be increased.

In the present invention, the object being coated has the shape of a pipe, and a UV curable resin coating composition is applied to the outer surface of an end portion of a steel pipe in a helical shape by moving spray nozzles in the pipe axial direction while rotating the object being treated (a steel pipe). Therefore, the coating thickness becomes nonuniform in the circumferential direction at the locations of the start and completion of coating, and portions where the coating thickness is not adequate develop. In order to avoid this situation, at the locations of the start of coating (such as the end of a steel pipe) and completion of coating (such as the rear end of a pin), movement of the nozzles in the pipe axial direction by the first nozzle support means is stopped (with the turning rollers continuing to rotate the pipe) so that coating takes place not in a helical shape but in the circumferential direction, and the UV curable resin coating composition is sprayed for at least 1/n minutes, wherein n is the rotational speed of the steel pipe in rpm (namely, for at least the time required for the steel pipe to make one rotation).

The illustrated example of a coating apparatus has a single pump and a total three nozzles including two outer surface nozzles and one inner surface nozzle. After the UV curable resin coating composition is warmed to a constant temperature by a heater, it is distributed among the three nozzles, and it is maintained at a constant pressure by the regulator for each system.

Compressed air for atomizing the coating composition into a mist is introduced into the nozzles. The nozzles have an internal switching valve for switching between coating and non-coating. When coating is stopped, the valves are switched to send the coating composition in the direction for circulation. The switching valves are operated pneumatically. On and off of the introduced compressed air is switched by an external signal, so switching between coating and circulation is carried out by an electrical signal.

In order to maintain the temperature of the coating composition, a circulation system is provided so as to circulate the coating composition between the heater and the nozzles when coating is stopped. As a result of this circulation, the temperature of the coating composition inside the piping of the apparatus is maintained constant, and it is possible to obtain a stable discharge of coating composition even under intermittent operation in which coating is started and stopped repeatedly.

When using the same nozzles, the coating amount per unit time is determined by the relationship between the pressure and the temperature of the coating composition. Accordingly, the coating conditions can be optimized by previously investigating the relationship of the coating amount to the pressure and temperature.

If the coating thickness on a plane of projection is t (μn) and the outer diameter of the steel pipe is D (mm), then the required coating amount Q (ml/minute) is given by the following Equation 2:

$$Q = t/10000 \times V/10 \times \pi \times D \quad (2).$$

In the above description, a coating apparatus according to the present invention was explained with respect to an embodiment in which a UV curable resin coating composition is applied to a pin formed on an end portion of a steel pipe, namely, to the outer surface of an end portion of a steel pipe having threads and to a recess on its inner surface. However, when a threaded joint for pipes is an integral joint, a box is formed on the inner surface of an end portion of a steel pipe, and it is sometimes desired to form a UV cured resin coating on the inner surface of an end portion of a steel pipe which has threads and which forms the box. In this case, for example, by exchanging the outer surface nozzles and the inner surface nozzle of the coating apparatus shown in FIGS. 1 and 2 so as to employ at least two nozzles having different angles of slope from each other as the inner surface nozzles, a UV curable resin coating composition can be uniformly applied to a box surface having threads provided on the inner surface of an end portion of a steel pipe. In this case, if necessary, it is also possible to apply a UV curable resin coating composition to the outer surface of the end portion of the steel pipe on which a threaded joint for pipes is not formed.

[UV Curable Resin Coating Composition]

A corrosion protecting coating formed on the surface of a threaded joint for pipes needs to be able to resist easy destruction of the coating when a force is applied to the coating at the time of mounting a protector. A protector is mounted on the pin or box of a threaded joint for pipes during storage to protect the joint. In addition, the corrosion protecting coating must not dissolve even when subjected to water formed by condensation at the dew point during transport or storage, and it must not readily soften even at a temperature exceeding 75° C.

A UV cured resin coating can satisfy such properties. Known UV curable resin coating compositions can be used which comprise at least a monomer, an oligomer, and a photopolymerization initiator and which induces a photopolymerization reaction to form a cured coating when irradiated with ultraviolet light. Below, the components of a typical UV curable resin coating composition will be explained, but the components of a coating composition are not limited thereto.

Monomer include di-, tri- or higher esters of a polyhydric alcohol with (meth)acrylic acid, as well as various (meth) acrylates, N-vinyl pyrrolidone, N-vinylcaprolactam, and styrene. Oligomers include epoxy (meth)acrylate, urethane (meth)acrylate, polyester (meth)acrylate, polyether (meth) acrylate, and silicone (meth)acrylate. (Meth)acrylic acid encompasses acrylic acid and methacrylic acid. Similarly, a (meth)acrylate encompasses an acrylate and a methacrylate.

Useful photopolymerization initiators are compounds having absorption in a wavelength range of 260-450 nm. Examples are benzoin and its derivatives, benzophenone and its derivatives, acetophenone and its derivatives, Michler's ketone, benzil and its derivatives, tetraalkylthiuram monosulfide, thioxanes, and the like. It is particularly preferable to use a thioxane.

From the standpoint of sliding properties, coating strength, or corrosion resistance, the UV cured resin coating may contain additives selected from a lubricant, a fibrous filler, and a rust preventing agent. Examples of a lubricant are waxes, metal soaps such as calcium stearate and zinc stearate, and polytetrafluoroethylene (PTFE). An example of a fibrous filler is acicular calcium carbonate such as "Whiskal" sold by Maruo Calcium, Co., Ltd. One or more substances selected from these lubricants and fibrous filler can be added in an amount of 0.05-0.35 parts by mass (the total amount when there are two or more) with respect to 1 part of the UV curable resin (the total amount of monomers and oligomers). Examples of a rust preventing agent are aluminum tripolyphosphate and aluminum phosphite. These additives can be added in an amount up to around 0.10 parts by mass with respect to 1 part by mass of the UV curable resin.

A UV cured resin coating is often transparent. From the standpoint of facilitating quality inspection visually or by image processing of the resin coating which is formed (inspection such as for the presence or absence of a coating, or for uniformity or unevenness of the coating thickness), the UV curable resin coating composition may contain at least one additive for imparting color to the resulting coating under visible light or ultraviolet light. The additives which are used can be selected from pigments, dyes, and fluorescent agents. Fluorescent agents sometimes do not give coloration to a coating under visible light, but they make the coating emit radiation at least under ultraviolet light and provide coloration. These additives can be commercially available ones, and there are no particular restrictions thereon as long as quality inspection of a solid corrosion protecting coating is possible visually or by image processing. Either organic or inorganic substances may be used.

Addition of a pigment causes the transparency of a UV cured resin coating decrease or disappear. If the coating becomes opaque, it becomes difficult to inspect for damage of coated threads. Accordingly, when using a pigment, one having a high degree of brightness such as a yellow or white pigment is preferred. From the standpoint of corrosion protection, the particle diameter of a pigment is preferably as fine as possible, and it is preferable to use a pigment with a mean particle diameter of at most 5 μm. Dyes do not greatly decrease the transparency of a UV cured resin coating, so there are no problems with using a dye having a strong color such as red or blue. The added amount of a pigment and a dye is preferably up to 0.05 parts by mass with respect 1 part by mass of the UV curable resin. If the amount exceeds 0.05 parts by mass, corrosion resistance may decrease. A more preferred added amount is at most 0.02 parts.

A fluorescent agent may be either a fluorescent pigment which includes an inorganic fluorescent pigment and a daylight fluorescent pigment or a fluorescent dye. A UV cured resin coating containing a fluorescent agent is colorless or a transparent color under visible light, but when it is irradiated with a black light or an ultraviolet light, it fluoresces and becomes colored, which makes it possible to ascertain whether or not a coating is present or to ascertain unevenness in the coating thickness. In addition, because it is transparent under visible light, the substrate beneath the UV curable resin coating, namely, the pin surface can be observed. Accordingly, inspection for damage of the threads of a pin is not obstructed by the UV cured resin coating. The added amount of a fluorescent agent to a UV cured resin coating is preferably up to approximately 0.05 parts by mass with respect to 1 part by mass of a UV curable resin. It is more preferably at most 0.02 parts by mass.

In order to make it possible to perform quality control not only of a UV cured resin coating but also of the threads of the pin forming a substrate (the outer surface of an end portion of a steel pipe), a fluorescent agent and particularly a fluorescent pigment is preferably used as an additive for coloration of the coating.

[UV Curable Resin Coating System]

After a UV curable resin coating composition is applied to the outer surface and/or the inner surface of an end portion of a steel pipe which is to be coated with a coating apparatus according to the present invention, the coated surface is irradiated with ultraviolet light by an ultraviolet irradiation apparatus in order to cure the UV curable resin in the coating composition.

The irradiation with ultraviolet light may be carried out at the same station as the coating apparatus. However, if a steel pipe is transported to a separate station from the coating apparatus after it has been coated with the UV curable resin coating composition and irradiation with ultraviolet light is carried out at the separate station, the irradiation apparatus can be simplified, and coating and irradiation with ultraviolet light can be carried out in parallel, thereby reducing the operating time (the cycle time, which in the present invention is the time from the start of coating to the completion of curing for one steel pipe).

According to the present invention, a system for forming a UV cured resin coating on the inner surface and/or the outer surface of an end portion of a steel pipe having threads is also provided. The system comprises the above-described coating apparatus for applying a UV curable resin coating composition, a steel pipe transporting means which transports a steel pipe in the lateral direction (in the transverse direction with respect to the pipe axial direction), and an ultraviolet light irradiation apparatus which is disposed on the downstream side of the coating apparatus in the direction of transport of the steel pipe and which has an irradiation lamp which irradiates one or both of the inner surface and the outer surface of the end portion of the steel pipe.

Figure 5:
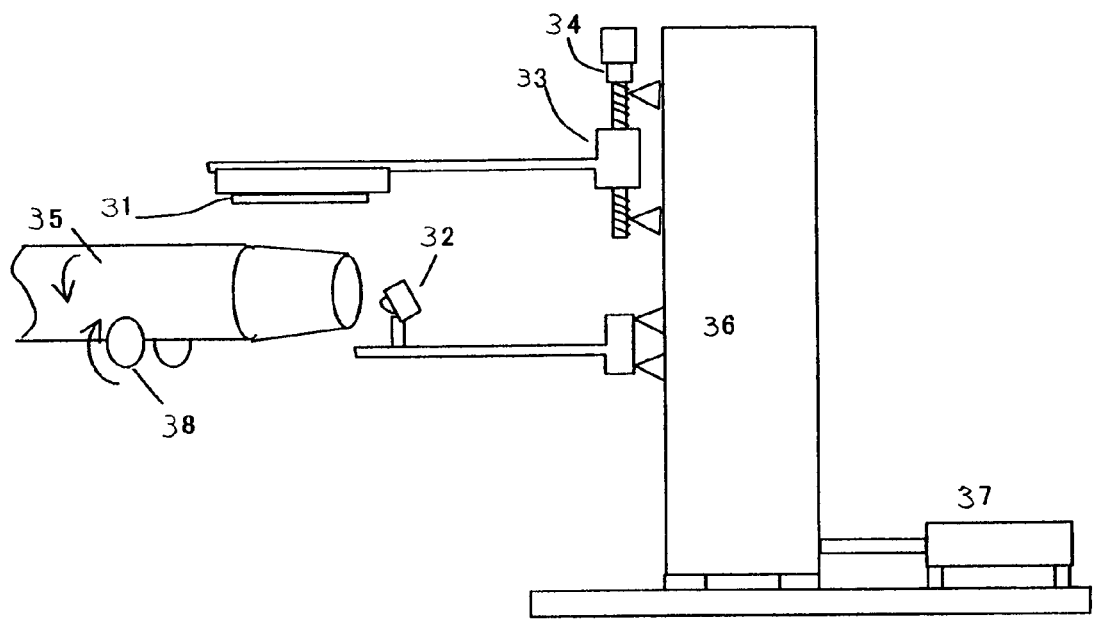
FIG. 5 is a diagram schematically showing an ultraviolet light irradiation apparatus used in a UV curable resin coating system according to the present invention.

One example of an ultraviolet light irradiation apparatus which can be used in the present invention is shown in FIG. 5. The apparatus shown in FIG. 5 has a UV lamp 31 for irradiating the outer surface of an end portion of a steel pipe, a UV lamp 32 for irradiating the inner surface thereof, a ball screw 33 which makes it possible for the outer surface irradiating UV lamp 31 to move upwards and downwards, a servomotor 34 for driving the ball screw, a body 36 of the irradiation apparatus, an air cylinder 37 which makes it possible for the body to move forwards and backwards, and a pair of turning rollers 38 for rotating the steel pipe 35 around its longitudinal axis. In the same manner as in the coating apparatus, additional turning roller pairs 38 are provided at a plurality of locations including at least a location in the vicinity of the other end of the steel pipe 35.

In the illustrated embodiment, a UV curable resin coating composition is applied to the entire surface of an end portion of a steel pipe constituting a pin, so the outer surface irradiating UV lamp 31 has a length which can irradiate the entire length of the end pin portion of the steel pipe. On the other hand, on the inner surface of the end portion of the steel pipe, a UV curable resin coating composition is applied only to the recess which is shorter in the axial direction from the end of the pipe. Therefore, it is not necessary for the inner surface irradiating UV lamp 32 to be a long lamp, and a spherical lamp, for example, may be used.

In order to cure the UV curable resin coating composition applied to the outer surface and the inner surface of an end portion of the steel pipe, the body 36 of the irradiation apparatus is advanced towards the steel pipe 35 such that the UV lamps 31 and 32 for irradiation of the outer surface and the inner surface approach the end portion of the pipe to be irradiated.

The size of steel pipes varies over a wide range from large to small diameter pipes, so the outer surface irradiation lamp 31 is made movable in the vertical direction by the ball screw 33 and the servomotor 34 to achieve a suitable distance from the surface of the steel pipe. For example, the distance between the outer surface of the steel pipe and the lamp is preferably adjusted to be in the range of 50-80 mm, and it is particularly preferable for it to be around 65 mm. Even if the size (diameter) of the steel pipe changes, the position of the bottom of the pipe does not change much. Therefore, if the inner surface irradiation lamp 32 is oriented so as to irradiate downwardly, position adjustment of this lamp in the vertical direction becomes unnecessary, and as shown in the drawing, the inner surface irradiation lamp 32 may be fixed in place. Of course, it is also possible for the inner surface irradiation lamp to be movable up and down in the same manner as the outer surface irradiation lamp. Furthermore, these lamps can be made movable in the axial direction of the pipe in the same manner as the nozzle support means.

The UV irradiation lamps may be commercially available ones which have an output wavelength in the range of 200-450 nm. Examples of an ultraviolet light source are high pressure mercury vapor lamps, ultrahigh pressure mercury vapor lamps, xenon lamps, carbon arc lamps, metal halide lamps, and sunlight. The duration of irradiation and the intensity of the irradiated ultraviolet light can be suitably set by one skilled in the art.

UV irradiation of the outer surface and the inner surface of an end portion of a steel pipe is carried out such that the irradiated energy is at least 450 mJ/cm$^2$, for example. In order to carry out irradiation without unevenness, irradiation is carried out while rotating the steel pipe about its longitudinal axis with the turning rollers 38. Conversely, the steel pipe may be stationary, and UV irradiation may be carried out while rotating the UV irradiation lamp.

Figure 6:
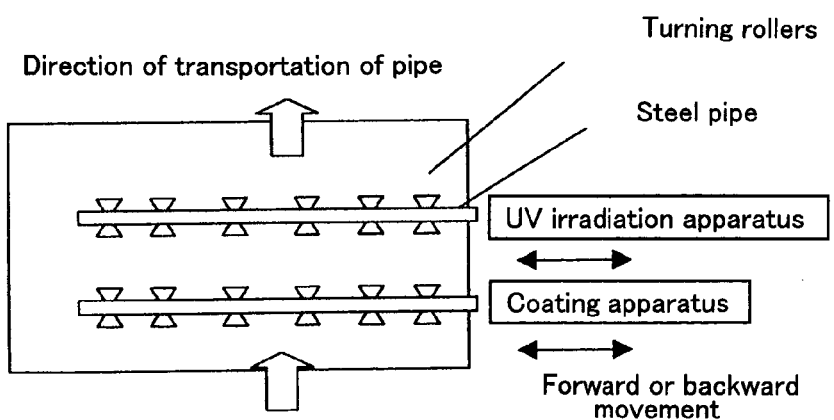
FIG. 6 is an explanatory view showing the positional relationship between a coating apparatus and an ultraviolet light irradiation apparatus in a UV curable resin coating system according to the present invention.

FIG. 6 schematically shows a system for forming a UV curable resin coating according to the present invention in which a coating apparatus and a UV light irradiation apparatus are disposed side by side so as to be movable in the axial directions of pipes. In the illustrated example, both the coating apparatus and the UV light irradiation apparatus have six pairs of turning rollers for rotating a steel pipe around its longitudinal axis. In this system, the pipes are transported in the lateral direction (the direction perpendicular to the pipe axis). Accordingly, the bodies 12 and 36 of the coating apparatus and the irradiation apparatus which coat and irradiate an end portion of a steel pipe are advanced towards the end portion of the steel pipe being processed prior to their operation, and after the completion of coating or ultraviolet irradiation, the bodies are retracted and the steel pipes are transported laterally. Since there is some variation in the positions of the ends of steel pipes, the system preferably includes a function which makes it possible to stop the bodies of the coating apparatus and the irradiation apparatus at a suitable distance from the end of a pipe by providing each of the bodies with a sensor for detecting the pipe end. Lateral transport of the steel pipes can be carried out using a V conveyor (a lateral conveyor having V-shaped supports), for example.

A preferable thickness of a UV curable resin coating is generally in the range of 10-40 μm, and a range of 25-35 μm is particularly preferable from the standpoint of achieving both corrosion protection and gas tightness (a metal-to-metal seal). According to the present invention, a UV curable resin coating having a uniform thickness with an average coating thickness of 25-35 μm such as approximately 30 μm with a tolerance of at most 10 μm even on threads can be formed on the surface of a threaded joint for pipes. Because the UV curable resin coating which is formed has excellent transparency thereby making it possible to observe the condition of the substrate without removing the coating, inspection of threads prior to makeup can be carried out from atop the coating. Accordingly, by forming this UV curable resin coating on the surfaces of a pin having threads which are formed on the outer surface of a steel pipe and which are easily damaged, it is made possible to easily inspect the threads of the pin for damage without removing the coating.

The invention claimed is:

1. A coating apparatus for applying by spray coating a UV curable resin coating composition to the outer surface or the inner surface of an end portion of a steel pipe which has threads and forms a pin or a box of a threaded joint, characterized by comprising
   a steel pipe support means which supports the steel pipe while rotating it about its longitudinal axis,
   a first spraying unit having at least two nozzles adapted to spray a UV curable resin coating composition by pneumatic atomization toward the outer or inner surface of the end portion of the steel pipe having threads,
   a UV curable resin supply system having a tank which stores a UV curable resin coating composition and a pump for supplying the UV curable resin coating composition from the tank to each nozzle of the first spraying unit, and
   a first nozzle support means which supports each nozzle of the first spraying unit configured to move in an axial direction of the steel pipe and in a vertical direction,
   wherein the two nozzles of the first spraying unit are disposed at positions which are different at least in the axial direction of the steel pipe at angles which are sloped such that the sprayed streams from the nozzles approach each other from opposite sides of a plane perpendicular to the axis of the steel pipe, and
   wherein the UV curable resin supply system has a first regulator for maintaining the spraying air pressure of the UV curable resin coating composition in each nozzle of the first spraying unit at a predetermined respective value and a heater for adjusting the viscosity of the UV curable resin coating composition, and
   wherein the UV curable resin supply system has a circulation path, the circulation path extending from each nozzle, passing through the pump and the heater, and returning to the nozzle so as to recirculate the UV curable resin coating composition from one or more of the nozzles when spraying of the UV curable resin coating composition from the nozzle has stopped.

2. The coating apparatus as set forth in claim 1 further comprising
   a second spraying unit having at least one nozzle for spraying a UV curable resin coating composition by pneumatic atomization toward whichever of the outer surface and the inner surface of the end portion of the steel pipe is not coated by the first spraying unit, and
   a second nozzle support means which supports the nozzle of the second spraying unit so as to be movable in the vertical direction,
   wherein the UV curable resin supply system supplies the UV curable resin coating composition from the tank to the nozzle of the second spraying unit and includes a second regulator for maintaining the spraying air pressure of the UV curable resin coating composition in the nozzle of the second spraying unit at a predetermined value.

3. The coating apparatus as set forth in claim 2 wherein the second nozzle support means also supports the nozzle of the second spraying unit so as to be movable in the axial direction of the pipe.

4. The coating apparatus as set forth in claim 1 wherein the two nozzles of the first spraying unit are disposed at positions which are different also in a circumferential direction of the steel pipe.

5. The coating apparatus as set forth in claim 1 wherein the first spraying unit sprays the UV curable resin coating composition toward the outer surface of the end portion of the steel pipe which constitutes a pin of a threaded joint for pipes.

6. The coating apparatus as set forth in claim 1 wherein the absolute value of the angle of slope of the two nozzles of the first spraying unit which are disposed at a sloped angle is in the range of 20°-40° for each nozzle with respect to a plane perpendicular to the axis of the steel pipe.

7. A coating apparatus as set forth in claim 2 wherein the circulation path includes the at least one nozzle of the second spraying unit.

8. A system for forming a UV curable resin coating on the inner or outer surface of an end portion of a steel pipe having threads comprising
- a coating apparatus as set forth in claim 1,
- a steel pipe transport means which transports a steel pipe in the lateral direction, and
- a UV light irradiation apparatus which is disposed downstream of the coating apparatus in the transport direction of the steel pipe and which has an irradiation lamp which irradiates one or both of the inner surface and the outer surface of the end portion of the steel pipe with ultraviolet light.

9. The system as set forth in claim 8 wherein the ultraviolet light irradiation apparatus has a mechanism for rotating the steel pipe around its longitudinal axis.

10. The system as set forth in claim 8 wherein the irradiation lamp of the ultraviolet light irradiation apparatus which irradiates the outer surface of the end portion of a steel pipe is supported so as to be movable in the vertical direction.

* * * * *